(12) United States Patent
Hartman et al.

(10) Patent No.: US 9,809,316 B2
(45) Date of Patent: Nov. 7, 2017

(54) AIRCRAFT SILL HEIGHT COMPENSATING EVACUATION SYSTEM

(71) Applicant: Goodrich Corporation, Charlotte, NC (US)

(72) Inventors: Drew Hartman, Phoenix, AZ (US); Jaro Volny, Phoenix, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 224 days.

(21) Appl. No.: 14/866,328

(22) Filed: Sep. 25, 2015

(65) Prior Publication Data

US 2017/0088274 A1  Mar. 30, 2017

(51) Int. Cl.
   *B64D 25/14* (2006.01)
(52) U.S. Cl.
   CPC .................. *B64D 25/14* (2013.01)
(58) Field of Classification Search
   CPC ..................................... B64D 25/14
   See application file for complete search history.

(56) References Cited

U.S. PATENT DOCUMENTS

| | | | | |
|---|---|---|---|---|
| 3,070,203 A | * | 12/1962 | Hailstone | A62B 1/20 182/48 |
| 3,458,009 A | * | 7/1969 | Favors | B64D 25/14 182/48 |
| 3,554,344 A | * | 1/1971 | Summer | B64D 25/14 182/48 |
| 3,833,088 A | * | 9/1974 | Chacko | B64D 25/14 182/48 |
| 4,333,546 A | | 6/1982 | Fisher | |
| 4,846,422 A | * | 7/1989 | Fisher | B64D 25/14 182/48 |
| 5,360,186 A | | 11/1994 | Danielson et al. | |
| 5,400,985 A | * | 3/1995 | Banks | B64D 25/14 182/48 |
| 5,875,868 A | | 3/1999 | Smialowicz | |
| 5,975,467 A | | 11/1999 | O'Donnell | |
| 6,676,082 B2 | | 1/2004 | Alberts | |
| 6,695,096 B2 | | 2/2004 | Idler | |
| 6,814,183 B2 | | 11/2004 | Horvath | |

(Continued)

FOREIGN PATENT DOCUMENTS

| | | |
|---|---|---|
| EP | 1306304 | 5/2003 |
| FR | 2727930 | 6/1996 |

OTHER PUBLICATIONS

Extended European Search Report dated Mar. 1, 2017 in European Application No. 16187425.0.

*Primary Examiner* — Brian M O'Hara
*Assistant Examiner* — Michael Kreiner
(74) *Attorney, Agent, or Firm* — Snell & Wilmer, L.L.P.

(57) ABSTRACT

An evacuation system is provided. The system may comprise a girt coupled to a door sill and an evacuation slide. The evacuation slide may comprise a head end coupled to the girt, an extension, a hinge portion coupled between the head end and the extension, and a lane diverter coupled to the evacuation slide. A method is also provided. The method may include opening a door to expose a door sill, inflating the evacuation slide with the evacuation slide coupled to the door sill, bending a hinge portion of the slide in response to a door sill height being less than or equal to a predetermined height, and redirecting a slide lane to a side exit.

15 Claims, 4 Drawing Sheets

(56) References Cited

U.S. PATENT DOCUMENTS

| | | | |
|---|---|---|---|
| 7,159,823 B1* | 1/2007 | Paustian, Jr. | B64D 25/14 |
| | | | 244/137.1 |
| 7,641,149 B2 | 1/2010 | McDonald | |
| 8,215,586 B2 | 7/2012 | O'Donnell | |
| 2011/0278092 A1* | 11/2011 | Brown | A62B 1/20 |
| | | | 182/48 |
| 2016/0171848 A1* | 6/2016 | Kohlmeier-Beckmann | |
| | | | B64D 47/02 |
| | | | 340/945 |
| 2017/0050737 A1* | 2/2017 | Hartman | B64C 1/1461 |
| 2017/0088273 A1* | 3/2017 | Prevost | B64D 25/14 |

* cited by examiner

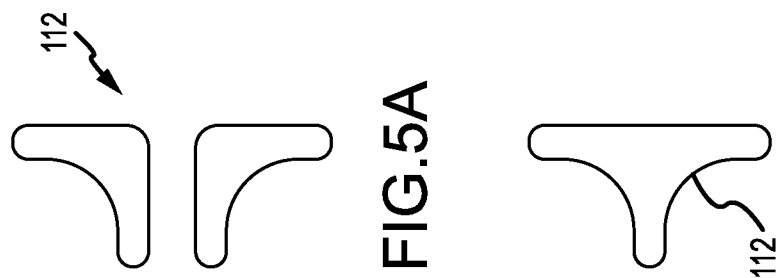
FIG.5A
FIG.5B
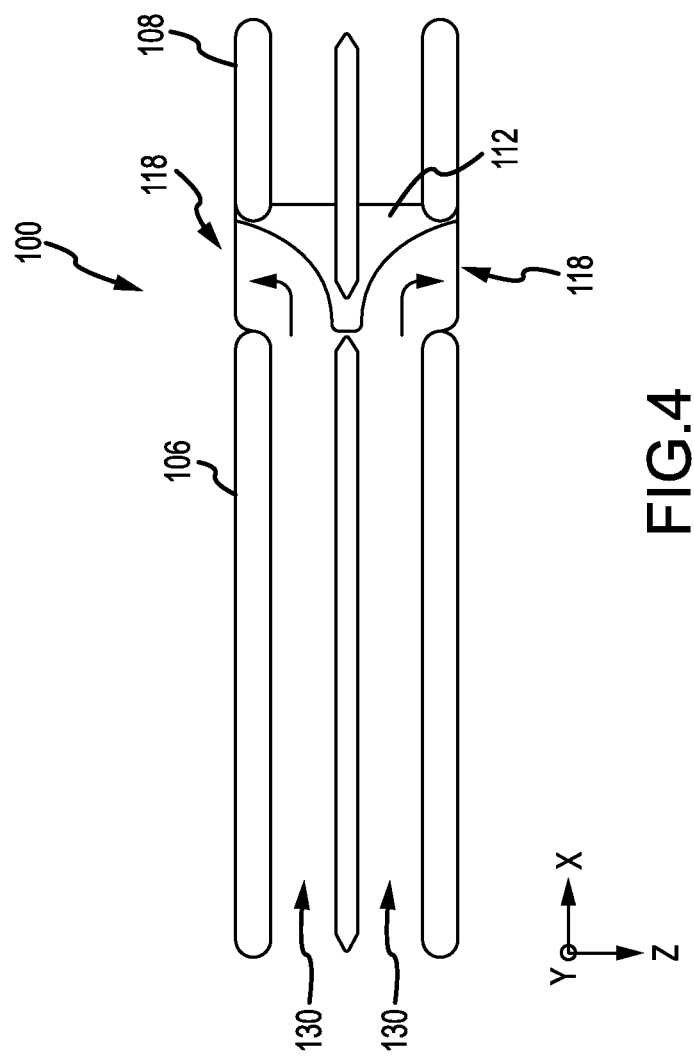
FIG.4

AIRCRAFT SILL HEIGHT COMPENSATING EVACUATION SYSTEM

FIELD

The present disclosure relates to inflatable evacuation slides and, in particular, to a sill height compensating evacuation system.

BACKGROUND

Emergency evacuation slides may be used to exit an aircraft absent a jet way or other suitable means of egress for passengers. The slides may deploy from a door sill on a side of the aircraft fuselage, for example. The sill height, or distance between the fuselage door sill and the landing surface, may vary in response to the presence of deployed landing gear, the contour of terrain, or a water landing, for example. An evacuation slide performs in the various possible deployment conditions with a suitable slide angle, or angle between the slide and a horizontal plane, regardless of sill height. However, as the sill height varies, the slide angle may vary as well. For example, the sill height of a plane without deployed landing gear may be reduced from the standard sill height of the aircraft with deployed landing gear. The reduced sill height may result in a lower slide angle when the evacuation slide deploys.

SUMMARY

An evacuation slide may comprise a slide lane, an extension, a hinge portion coupled between the extension and a head end of the evacuation slide configured to buckle in response to bearing a weight of at least 50 lbs and in response to a door sill height being less than or equal to a predetermined height, and a lane diverter coupled to the evacuation slide. The lane diverter may be configured to contact an exit surface and deform a portion of the evacuation slide in response to the buckling.

In various embodiments, the hinge portion may be configured to remain in an unbuckled position in response to the door sill height being greater than the predetermined height. The hinge portion may comprise a smaller cross-sectional thickness than a cross-sectional thickness of the evacuation slide. A cross-sectional thickness of the hinge portion may be between 20% and 80% of a cross-sectional thickness of the evacuation slide. A location of the hinge portion may be configured such that the evacuation slide maintains an angle with a horizontal plane of between 23° and 53° in response to the evacuation slide being deployed. The deforming may be configured to redirect the slide lane to a side exit of the evacuation slide. The lane diverter may be coupled to a bottom surface of the evacuation slide. In various embodiments, the evacuation slide may further comprise a girt coupled to the evacuation slide.

An evacuation system may comprise a girt coupled to a door sill and an evacuation slide. The evacuation slide may comprise a head end coupled to the girt, an extension, a hinge portion coupled between the head end and the extension, and a lane diverter coupled to the evacuation slide.

In various embodiments, the hinge portion may be configured to buckle in response to bearing a weight of at least 50 lbs and in response to a height of the door sill being less than or equal to a predetermined height. The lane diverter may be configured to contact an exit surface in response to the buckling. The lane diverter may be configured to deform a portion of the evacuation slide in response to the contacting the exit surface. The evacuation slide may further comprise a slide lane and a side exit, the lane diverter configured to divert the slide lane to the side exit in response to the deforming. The hinge portion may be configured to remain unbuckled in response to a height of the door sill being greater than a predetermined height. The hinge portion may comprise a smaller cross-sectional thickness than a cross-sectional thickness of the evacuation slide. A cross-sectional thickness of the hinge portion may be between 20% and 80% of a cross-sectional thickness of the evacuation slide. A location of the hinge portion may be configured such that the evacuation slide maintains an angle with a horizontal plane of between 23° and 53° in response to the evacuation slide being deployed.

A method for deploying an evacuation slide may include the steps of opening a door to expose a door sill, inflating the evacuation slide with the evacuation slide coupled to the door sill, bending a hinge portion of the slide in response to a door sill height being less than or equal to a predetermined height, and redirecting a slide lane to a side exit.

In various embodiments, the redirecting may be performed by a lane diverter deforming a portion of the evacuation slide to divert the slide lane to the side exit. The redirecting may be performed in response to the lane diverter contacting an exit surface.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 4 illustrates a top view of an evacuation slide with a lane diverter diverting the slide lanes to the side exits, in accordance with various embodiments;

FIG. 5A illustrates a lane diverter, in accordance with various embodiments; and FIG. 5B illustrates a lane diverter, in accordance with various embodiments.

DETAILED DESCRIPTION

Figure 1:
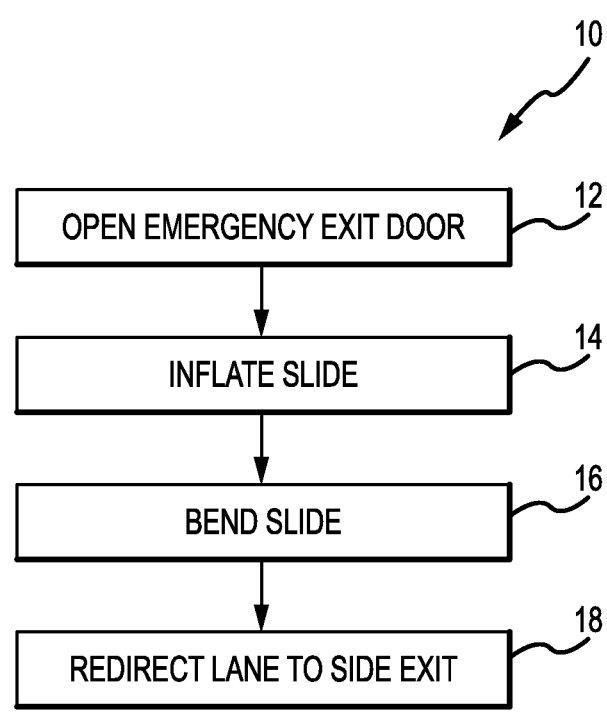
FIG. 1 illustrates a process for deploying an evacuation slide from an aircraft, in accordance with various embodiments.

The detailed description of exemplary embodiments herein makes reference to the accompanying drawings, which show exemplary embodiments by way of illustration.

While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Slides according to the present disclosure may extend from an aircraft fuselage door sill to an exit surface. The exit surface may be a runway, uneven terrain, or water, for example. A fuselage door sill may be located at a standard sill height when the aircraft is supported by all landing gear on a flat surface, such as a runway for example, and the fuselage is parallel or approximately parallel to the exit surface, where the sill height is measured as the distance between the door sill and the exit surface. Furthermore, a fuselage door sill may be located at a high sill height if the aircraft is resting at a nonstandard pitch or roll angle or the evacuation is uneven or in a liquid such that the sill height is higher than the standard sill height. Further still, a fuselage door sill may be located at a low sill height if the aircraft is resting at a nonstandard pitch or roll angle or the evacuation is uneven or in a liquid such that the sill height is lower than the standard sill height. For example, if an aircraft is supported by only one main landing gear, the aircraft may rest at a roll angle wherein the door sill on the broken landing gear side may comprise a low sill height and the door sill on the deployed landing gear side may comprise a high sill height, for example. When an exit door sill is located at a high sill height, then the slide of the present disclosure may be configured to fully extend to maintain a proper slide angle. In the event of a standard sill height, the slide may be configured to buckle under the weight of an evacuee at a hinge portion wherein a lane diverter of the slide may contact the exit surface, deflecting the lane diverter into the slide, thus deforming the slide and blocking the lane to divert passengers to a side exit.

As used herein, the weight of a typical evacuee may be, for example, a weight of between 50 lbs and 350 lbs according to various embodiments, between 80 lbs and 300 lbs according to various embodiments, and between 90 lbs and 200 lbs according to still further embodiments. Thus, according to various embodiments, a hinge portion of an evacuation slide, as described herein, may be configured to buckle in response to bearing the weight of an evacuee, or at least 50 lbs, for example.

With reference to FIG. 1, a method 10 of deploying an emergency evacuation slide is shown, in accordance with various embodiments. Method 10 may be carried out on evacuation system 100 illustrated in FIGS. 2, 3 and 4, for example. Method 10 may begin by opening an emergency exit door (Step 12). The door may be opened by the crew or a passenger in an evacuation situation. The slide may be inflated (Step 14) in response to opening the emergency exit door. The slide may bend or buckle under the weight of an evacuee (Step 16) in response to a normal or low sill height, or a sill height which is less than or equal to a predetermined height. A slide lane may be redirected to a side exit (Step 18) in response to a lane diverter making contact with the exit surface, as detailed below with reference to FIGS. 2 and 3.

Figure 2:
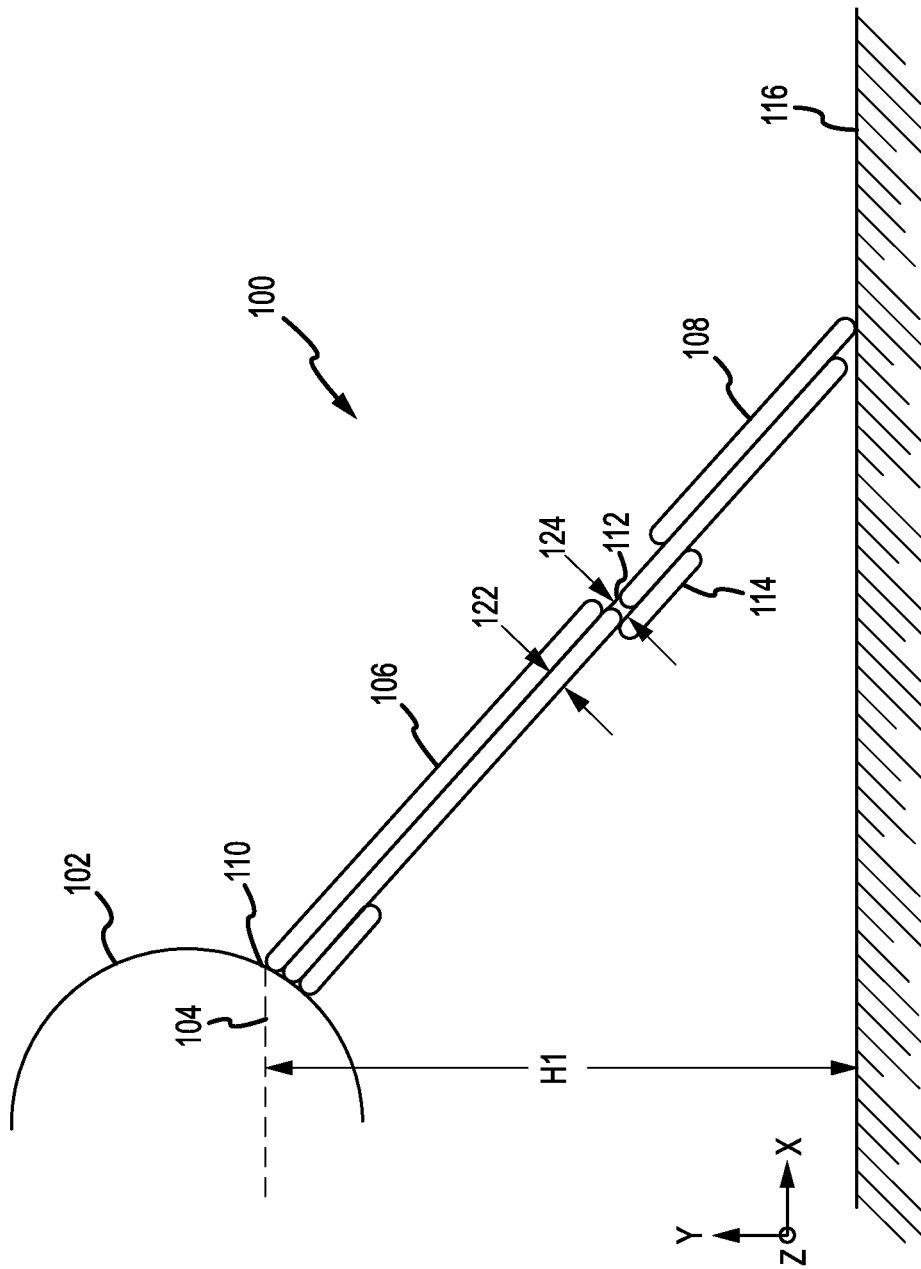
FIG. 2 illustrates an exemplary aircraft having an evacuation slide in a deployed position where the door sill height is greater than a predetermined height, in accordance with various embodiments.

With reference to FIG. 2, evacuation system 100 is shown having an evacuation slide 106 with hinge portion 112 and lane diverter 114, in accordance with various embodiments. An x-y-z axis is provided for ease of illustration. In various embodiments, as previously described, evacuation slide 106 may be inflated in response to opening the emergency exit door. Accordingly, evacuation slide 106, lane diverter 114, and extension 108 may be inflated at or near the same time. In various embodiments, lane diverter 114 may be coupled to evacuation slide 106. In various embodiments, lane diverter 114 may be coupled to a bottom surface of evacuation slide 106, where bottom in this regard refers to the negative y-direction. In various embodiments, extension 108 may be coupled to hinge portion 112. In various embodiments, the portion of evacuation slide 106 which is attached to door sill 104 may be referred to herein as the head end and extension 108 may be referred to herein as the toe end. Thus, hinge portion 112 may be coupled between the extension and the head end of evacuation slide 106.

In various embodiments, hinge portion 112 may be a portion of evacuation slide 106 which comprises a smaller cross-sectional thickness 124 than the cross-sectional thickness 122 of evacuation slide 106. For example, the cross-sectional thickness 124 of hinge portion 112 may be between twenty percent and 100 percent (20%-100%) of the cross-sectional thickness 122 of evacuation slide 106 in accordance with various embodiments, and in further embodiments between twenty percent and eighty percent (20%-80%) of the cross-sectional thickness 122 of evacuation slide 106 and between fifty percent and seventy-five percent (50%-75%) of the cross-sectional thickness 122 of evacuation slide 106 in even further embodiments.

Evacuation system 100 may include a door sill 104 located at an exit of fuselage 102. Door sill 104 may form a lower portion of the threshold of fuselage 102. Evacuation slide 106 may be coupled to door sill 104 by girt 110. In that regard, door sill 104, girt 110, and evacuation slide 106 may form a continuous exit path from fuselage 102.

In various embodiments, door sill 104 may have a height H1 above exit surface 116. Girt 110 may also have a height H1 above exit surface 116. Height H1 of door sill 104 may be a result of uneven terrain and/or landing gear height, for example, increasing the distance between door sill 104 and exit surface 116 from a standard sill height as described above. In various embodiments, a predetermined height of door sill may be determined, over which hinge portion 112 of evacuation slide 106 is configured to remain unbuckled such that extension (or toe) 108 of evacuation slide 106 is parallel with evacuation slide 106. If height H1 is greater than the predetermined height, then hinge portion 112 may remain in an unbuckled position such that extension 108 remains parallel to evacuation slide 106. If height H1 is greater than the predetermined height, then lane diverter 114 may hang or suspend below evacuation slide 106.

Figure 3:
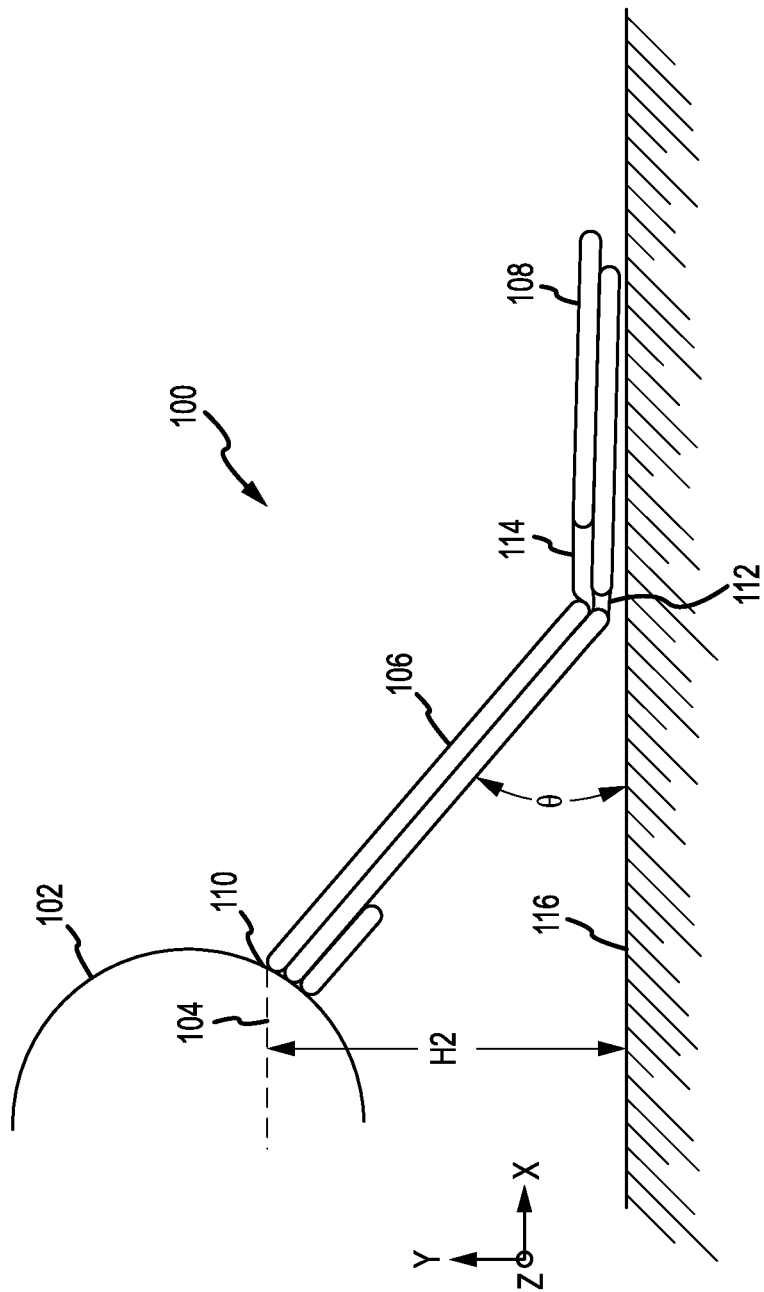
FIG. 3 illustrates an exemplary aircraft having an evacuation slide in a deployed position where the door sill height is equal to a predetermined height, in accordance with various embodiments.

With respect to FIG. 3, elements with like element numbering as depicted in FIG. 2, are intended to be the same and will not necessarily be repeated for the sake of clarity.

With reference to FIG. 3, evacuation system 100 is shown having an evacuation slide 106 with hinge portion 112 and lane diverter 114, in accordance with various embodiments. Height H2 of door sill 104 may be a result of a normal landing situation, thus height H2 may be a normal landing height. In various embodiments, the height H2 may depend on the type of aircraft. In various embodiments, height H2 may be less than or equal to the predetermined height. In various embodiments, hinge portion 112 of evacuation slide 106 may buckle under the weight of an evacuee (or bend) when door sill 104 is located at height H2 above exit surface 116. With reference now to FIG. 3 and FIG. 4, lane diverter 114 may contact exit surface 116 in response to the bending of hinge portion 112, thus deforming a portion of evacuation slide 106 to divert slide lanes 130 to side exits 118. Although FIG. 4 shows evacuation system 100 having two slide lanes 130, evacuation system 100 may comprise an evacuation slide 106 which includes one or more slide lanes 130. For example, evacuation slide 106 may comprise a single slide lane 130. Accordingly, evacuation slide 106 may comprise a single slide lane and/or a dual slide lane. In various embodiments, side exits 118 may allow a greater rate of passengers to exit fuselage 102 as opposed to having passengers continue down the now horizontal path along extension 108. In various embodiments, lane diverter 114 may prevents passengers from continuing down the extension 108 of evacuation slide 106.

With reference again to FIG. 3, the location of hinge portion 112 may be configured such that angle θ of evacuation slide 106 stays within a threshold value in response to evacuation slide 106 being deployed as shown in FIG. 2 and FIG. 3. Angle θ may be defined as the angle of evacuation slide 106 and the horizontal plane (x-z plane), wherein the horizontal plane, as used herein, is defined as a plane which is normal to the direction of gravitational pull. The threshold value of angle θ may be between twenty degrees and sixty degrees (20°-60°), in accordance with various embodiments. In various embodiments, when door sill 104 is located at a high sill height (e.g., when door sill 104 is located at a height which is greater than the predetermined height), the threshold value of angle θ may be between thirty degrees and fifty degrees (30°-50°). In various embodiments, when door sill 104 is located at a standard sill height (e.g., when door sill 104 is located at a height which is equal to the predetermined height), the threshold value of angle θ may be between twenty-three degrees and forty degrees (23°-40°).

With reference to FIG. 5A and FIG. 5B, lane diverter 114 may comprise a triangular geometry as illustrated in FIG. 5A, in accordance with various embodiments. Lane diverter 114 may comprise a single piece or a plurality of pieces, such as two pieces as shown in FIG. 5B. Lane diverter 114 may comprise two pieces whose geometry comprise an "L" shape as shown in FIG. 5B.

Hinge portion 112 and lane diverter 114 may comprise a passive system, thus providing appropriate evacuation slide angles without using aircraft roll and pitch sensors. Evacuation system 100 may thus be self-contained without electronic connection to flight controls and sensors. Furthermore, a passive system may reduce aircraft weight by eliminating the need for measurement devices.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation slide, comprising:
    a slide lane;
    an extension;
    a hinge portion coupled between the extension and a head end of the evacuation slide configured to buckle in response to bearing a weight of at least 50 lbs and in response to a door sill height being less than or equal to a predetermined height; and
    a lane diverter coupled to the evacuation slide, the lane diverter configured to contact an exit surface and deform a portion of the evacuation slide in response to the buckling;
    wherein the deforming is configured to redirect the slide lane to a side exit of the evacuation slide.

2. The evacuation slide of claim 1, wherein the hinge portion is configured to remain in an unbuckled position in response to the door sill height being greater than the predetermined height.

3. The evacuation slide of claim 1, wherein the hinge portion comprises a smaller cross-sectional thickness than a cross-sectional thickness of the evacuation slide.

4. The evacuation slide of claim 1, wherein a cross-sectional thickness of the hinge portion is between 20% and 80% of a cross-sectional thickness of the evacuation slide.

5. The evacuation slide of claim 1, wherein a location of the hinge portion is configured such that the evacuation slide maintains an angle with a horizontal plane of between 23° and 53° in response to the evacuation slide being deployed.

6. The evacuation slide of claim 1, wherein the lane diverter is coupled to a bottom surface of the evacuation slide.

7. The evacuation slide of claim 1, further comprising a girt coupled to the evacuation slide.

8. An evacuation system, comprising:
a girt coupled to a door sill;
an evacuation slide comprising:
  a head end coupled to the girt;
  an extension;
  a hinge portion coupled between the head end and the extension; and
  a lane diverter coupled to the evacuation slide;
wherein the hinge portion is configured to buckle in response to bearing a weight of at least 50 lbs and in response to a height of the door sill being less than or equal to a predetermined height;
wherein the lane diverter is configured to contact an exit surface in response to the buckling;
wherein the lane diverter is configured to deform a portion of the evacuation slide in response to the contacting the exit surface; and
wherein the evacuation slide further comprises a slide lane and a side exit, the lane diverter configured to divert the slide lane to the side exit in response to the deforming.

9. The evacuation slide of claim 8, wherein the hinge portion is configured to remain unbuckled in response to a height of the door sill being greater than a predetermined height.

10. The evacuation system of claim 8, wherein the hinge portion comprises a smaller cross-sectional thickness than a cross-sectional thickness of the evacuation slide.

11. The evacuation slide of claim 8, wherein a cross-sectional thickness of the hinge portion is between 20% and 80% of a cross-sectional thickness of the evacuation slide.

12. The evacuation slide of claim 8, wherein a location of the hinge portion is configured such that the evacuation slide maintains an angle with a horizontal plane of between 23° and 53° in response to the evacuation slide being deployed.

13. A method for deploying an evacuation slide, comprising:
opening a door to expose a door sill;
inflating the evacuation slide with the evacuation slide coupled to the door sill;
bending a hinge portion of the evacuation slide in response to a door sill height being less than or equal to a predetermined height; and
redirecting a slide lane to a side exit.

14. The method according to claim 13, wherein the redirecting is performed by a lane diverter deforming a portion of the evacuation slide to divert the slide lane to the side exit.

15. The method according to claim 13, wherein the redirecting is performed in response to the lane diverter contacting an exit surface.

\* \* \* \* \*